United States Patent
Srivastava et al.

(10) Patent No.: US 11,513,861 B2
(45) Date of Patent: Nov. 29, 2022

(54) QUEUE MANAGEMENT IN SOLID STATE MEMORY

(71) Applicant: International Business Machines Corporation, Armonk, NY (US)

(72) Inventors: Ankur Srivastava, Pune (IN); Kushal Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 16/554,662

(22) Filed: Aug. 29, 2019

(65) Prior Publication Data
US 2021/0064430 A1 Mar. 4, 2021

(51) Int. Cl.
*G06F 9/46* (2006.01)
*G06F 9/50* (2006.01)
*G06F 3/06* (2006.01)

(52) U.S. Cl.
CPC .......... *G06F 9/505* (2013.01); *G06F 3/0611* (2013.01); *G06F 3/0653* (2013.01); *G06F 3/0679* (2013.01)

(58) Field of Classification Search
CPC ...... G06F 9/505; G06F 3/0611; G06F 3/0653; G06F 3/0679
See application file for complete search history.

(56) References Cited

U.S. PATENT DOCUMENTS

| | | | |
|---|---|---|---|
| 6,173,306 B1 * | 1/2001 | Raz | G06F 9/5083 718/105 |
| 9,342,456 B2 * | 5/2016 | Kobayashi | G06F 3/067 |
| 9,485,310 B1 * | 11/2016 | Bono | G06F 16/1824 |
| 10,019,181 B2 | 7/2018 | Singh et al. | |
| 10,140,036 B2 | 11/2018 | Kelner et al. | |
| 2013/0247068 A1 * | 9/2013 | Min | G06F 9/5088 718/105 |
| 2018/0321864 A1 | 11/2018 | Benisty | |
| 2019/0082010 A1 | 3/2019 | Friedman et al. | |
| 2020/0293495 A1 * | 9/2020 | Balachandran | G06F 11/1435 |

OTHER PUBLICATIONS

Cho et al, A high performance load balance strategy for real-time multicore systems, The Scientific World Journal, vol. 2014, Article ID 101529, 14 pages.*

(Continued)

*Primary Examiner* — Diem K Cao
(74) *Attorney, Agent, or Firm* — Daniel M. Yeates

(57) ABSTRACT

Disclosed is a computer implemented method to manage queue overlap in storage systems, the method comprising, identifying, by a storage system, a plurality of queues including a first queue and a second queue. The storage system includes a plurality of cores, including a first core and a second core, and wherein the first queue is associated with a first host and the second queue is associated with a second host. The method also comprises, determining the first queue and the second queue are being processed by the first core. The method further comprises, monitoring the workload of each cores and identifying a load imbalance, wherein the loam imbalance a difference between a first workload associated with the first core, and a second workload associated with the second core. The method also comprises, notifying the second host that the load imbalance is present.

17 Claims, 5 Drawing Sheets

(56) References Cited

OTHER PUBLICATIONS

"NVM Express", Revision 1.3, May 1, 2017, Section 1.4, 282 pages.
Mell et al., "The NIST Definition of Cloud Computing", Recommendations of the National Institute of Standards and Technology, U.S. Department of Commerce, Sep. 2011, 7 pages.

\* cited by examiner

QUEUE MANAGEMENT IN SOLID STATE MEMORY

BACKGROUND

The present disclosure relates to storage systems, and, more specifically, to improving queue management in non-volatile memory express systems.

Solid state memory systems (e.g., flash, SSD, etc.) have many benefits over traditional hard disk drives (HDD). Solid state is faster and has no moving parts that can fail. However, many interface standards were developed to operate with the moving parts of a traditional HDD (e.g., SATA, SAS, etc.). There are new protocols that are designed for faster data transfer between servers, storage devices, flash controllers, and other similar components. These new systems may provide a register interface and command set that enables high performance storing and retrieving of data in a storage medium.

SUMMARY

Disclosed is a computer implemented method to manage queue overlap in storage systems, the method comprising, identifying, by a storage system, a plurality of queues including a first queue and a second queue, wherein the storage system includes a plurality of cores, including a first core and a second core, and wherein the first queue is associated with a first host and the second queue is associated with a second host. The method also comprises, determining the first queue and the second queue are being processed by the first core. The method further comprises, monitoring the workload of each of the plurality of cores and identifying a load imbalance, wherein identifying the load imbalance comprises determining a difference between a first workload associated with the first core, and a second workload associated with the second core. The method also comprises, notifying the second host that the load imbalance is present. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
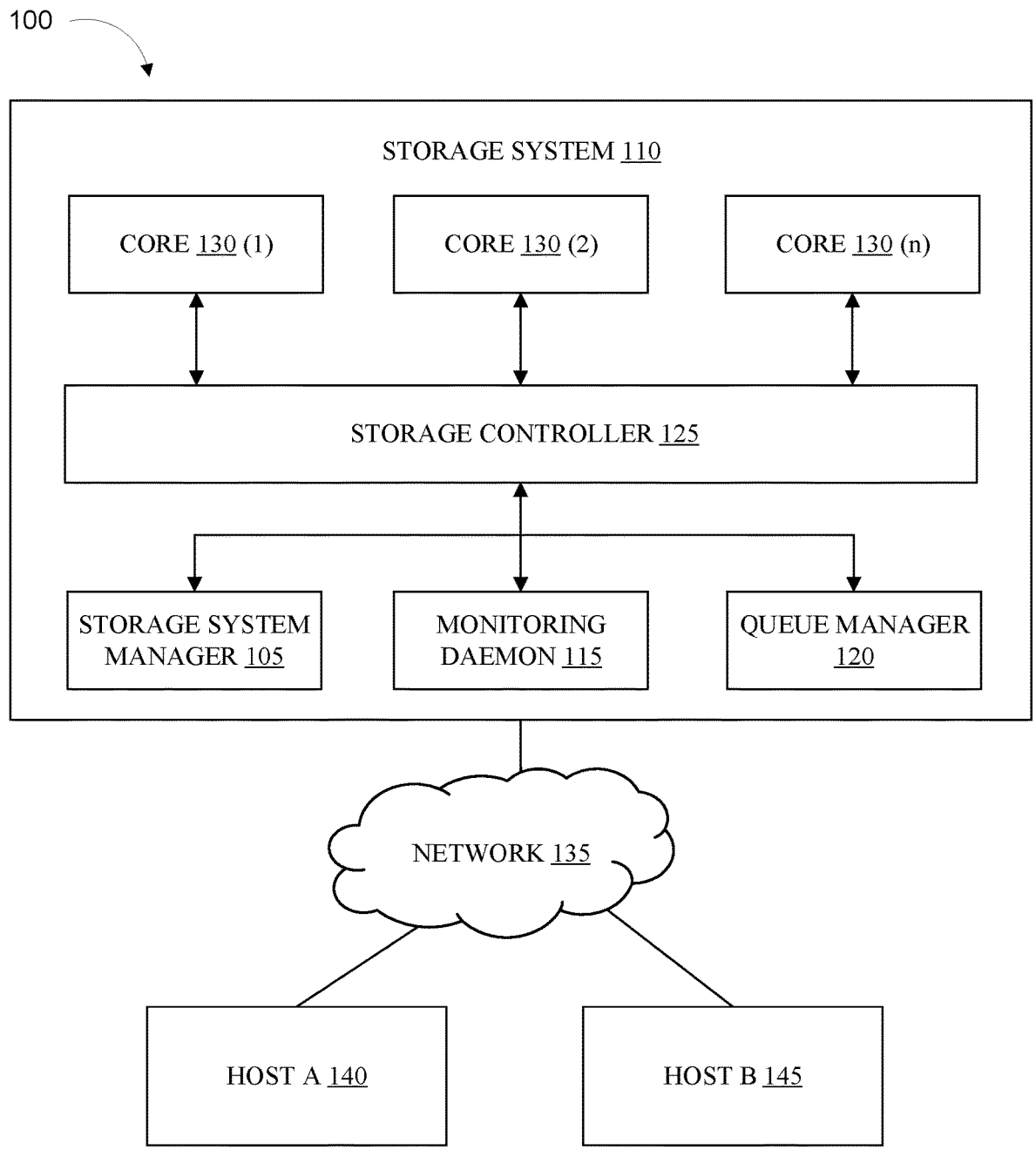
FIG. 1 illustrates a functional diagram that illustrates a computing environment suitable for operation of storage system manager in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The present disclosure relates to storage systems, and, more specifically, to improving queue management in non-volatile memory express systems. Aspects of the present disclosure may be better appreciated in light of the aforementioned applications.

Solid state memory systems (e.g., flash, SSD, etc.) have many benefits over traditional hard disk drives (HDD). Solid state is faster and has no moving parts that can fail. However, many interface standards were developed to operate with the moving parts of a traditional HDD (e.g., SATA, SAS, etc.).

There are new protocols that are designed for faster data transfer between servers, storage devices, flash controllers, and other similar components. These new systems can provide a register interface and command set that enables high performance storing and retrieving of data in a storage medium. One advantage of new storage protocols over some older storage standards (e.g., SCSI, SAS, SATA, etc.) is reduced latency of access in the host software stack, leading to higher input/output per second (IOPS) and lower computing resource utilization. Non-volatile memory express (NVMe) is an example of one new storage protocol.

NVMe can support parallel input/output (I/O) processing with multicore computing machines (e.g., servers) that results in faster I/O dispensation and subsequently a reduction in latency. Since there are multiple cores that are processing I/O request simultaneously (e.g., parallel processing), system performance increases due to increased utilization of computing resources.

A network fabric is a network topology in which components pass data to a variety of locations through interconnected switches. Spreading the network traffic across multiple physical links (e.g., switches) can yield a higher total throughput. NVMe over fabrics (NVMe-oF) is an extension of standard NVMe that allows benefits of high performance and low latency across network fabrics. NVMe-oF can support multiple I/O queues for regular I/O operations from various hosts to a storage system.

NVMe can support up to approximately 64,000 queues with up to approximately 64,000 entries per queue. When an initiator device (e.g., a host) connects to a target device (e.g., a NVMe storage system), a special purpose queue (e.g., admin queue) is established. The initiator can then create additional queues in the target device with the same NVMe qualified name (NQN). NQN is a connection and naming protocol for NVMe storage systems. Those queues are then sent to and processed by a core in the storage system.

When two or more hosts are connected to a single storage system, it is possible and likely that multiple hosts send a queue to the same core at the same time. This is called core overlap, queue overlap, I/O overlap, and/or overlapping queues. Overlap may negate some of the benefits of parallel processing and/or affect host application's I/O performance.

Additionally, if the two queues assigned to a first core have a high I/O workload relative to queues assigned to a second core, then the overall system will be imbalanced. This may cause a decrease in the overall IOPS, create performance issues in the storage system, and increase overall latency.

Embodiments of the present disclosure may improve host application performance and storage system performance by monitoring for queue overlap thereby preventing: performance degradation, a drop in response time, and/or a reduction of IOPS.

Embodiments of the current disclosure include a storage system manager. The storage system manager can monitor each core and determine if and/or how many queues are established on each core. This can reduce queue overlap and lead to a better overall system efficiency.

Embodiments of the present disclosure can monitor the workload of cores that contain a queue overlap. In some embodiments, a monitoring daemon is used to monitor the workload of the core. The monitoring daemon can operate in parallel to the storage system manager and/or a queue manager. This allows the system to determine when there is a load imbalance across various cores.

Embodiments of the present disclosure can notify hosts of the load imbalance and/or queue overlap. The notification can occur in-band (e.g., via the NQN), or out-of-band (e.g., via a different connection). The host can then abort (or terminate) and recreate connections, or continue the connections based on the current I/O needs. This will allow for better overall performance of both the host system and the storage system. It may also improve load balancing across the cores.

Embodiments of the present disclosure increase the overall performance of the storage system. The increase in performance may result from monitoring and adjusting for core overlap situations that cause degradation. This can include an increase of overall IOPS. Additionally, embodiments of the present disclosure can be implemented on existing storage system architecture with little or no new hardware and/or software.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100, that is capable of running a storage system manager, in accordance with one or more embodiments of the present disclosure. Many modifications to the depicted environment may be made by those skilled in the art without departing from the scope of the disclosure as recited by the claims.

Computing environment 100 includes storage system 110, network 135, host A 140, and host B 145. Network 135 can be, for example, a telecommunications network, a local area network (LAN), a wide area network (WAN), such as the Internet, or a combination of the three, and can include wired, wireless, or fiber optic connections. Network 135 may include one or more wired and/or wireless networks that are capable of receiving and transmitting data, voice, and/or video signals, including multimedia signals that include voice, data, and video information. In general, network 135 may be any combination of connections and protocols that will support communications between storage system 110, host A 140, host B, 145 and other computing devices (not shown, e.g., additional hosts) within computing environment 100.

Storage system 110 can be a standalone computing device, a management server, a web server, a mobile computing device, or any other electronic device or computing system capable of receiving, sending, and processing data. In other embodiments, storage system 110 can represent a server computing system utilizing multiple computers as a server system, such as in a cloud computing environment. In some embodiments, storage system 110 represents a computing system utilizing clustered computers and components (e.g., database server computers, application server computers, etc.) that act as a single pool of seamless resources when accessed within computing environment 100. In some embodiments, storage system 110 can include one or more storage medium. The storage medium can include solid state drives (SSD) of any type. In some embodiments, storage system 110 is a NVMe storage system.

In some embodiments, storage system 110 uses peripheral component interconnect express (PCLe) as a physical component to transfer data to and from the storage medium. PCLe is a high-speed connection and bus. PCLe can have a higher throughput with a lower pin count than some other standard connection types (e.g., PCI, AGP, etc.).

In some embodiments storage system 110 includes monitoring storage system manager 105, daemon 115, queue manager 120, storage controller 125, and core 130 (1) through core 130 (*n*), collectively referred to as cores 130.

Storage controller 125 can be any combination of hardware and/or software configured to facilitate the I/O queue transfer from an initiating device (e.g., host A 140) to cores 130. In various embodiments, storage controller 125 can include one or more of storage system manager 105, monitoring daemon 115, and queue manager 120. However, FIG. 1 shows them as separate components within storage system 110. In some embodiments, storage controller 125 sends notification to host A 140 and/or host B 145

Monitoring daemon 115 can be any combination of hardware and/or software configured to monitor if/how many queues are mapped to each core, and to monitor the workload of each core. In some embodiments, monitoring daemon 115 is a disk and execution monitor. It can be continuously running or be initiated as a host forms a connection to storage system 110, or any other similar trigger.

Queue manager 120 can be any combination of hardware and or software configured to set up and maintain an admin queue for each initiator connected to the storage system. Each time an I/O queue is sent from a host to the target, it passes through the admin queue. The admin queue then assigns the queue to a core based on instruction and logic in storage controller 125. After a core completes the processing of the command I/O queue, the result is placed in the admin queue and is subsequently forwarded to the host.

In some embodiments, queue manager 120 keeps a record of how many queues have been sent to and returned from each core. Therefore, at any time queue manager 120 can determine the number of queues distributed to any particular core.

Cores 130 can be any combination of hardware and software configured to process I/O queues. Cores 130 may be integrated into storage system 110 and capable reading and writing data to solid state storage mediums. In some embodiment cores 130 are processors (CPU).

In some embodiments, cores 130 include a submission queue and a completion queue. Each core may receive data from the I/O queue into its submission queue, and then store results in the completion queue.

Host A 140 and host B 145 can be of any of a number of different data processing systems including client computing devices, server computing devices, a tablet computer, laptop computer, telephone or other communication device, a personal digital assistant (PDA), or the like. In some illustrative examples, host A 140 and host B 145 may be a portable computing device that is configured with flash memory to provide non-volatile memory for storing operating system files and/or user-generated data. In various embodiments, host A 140 and host B 145 include software, hardware, and other necessary components to connect to storage system 110 via network 135 such that data can be passed between the various computing devices.

Figure 2:
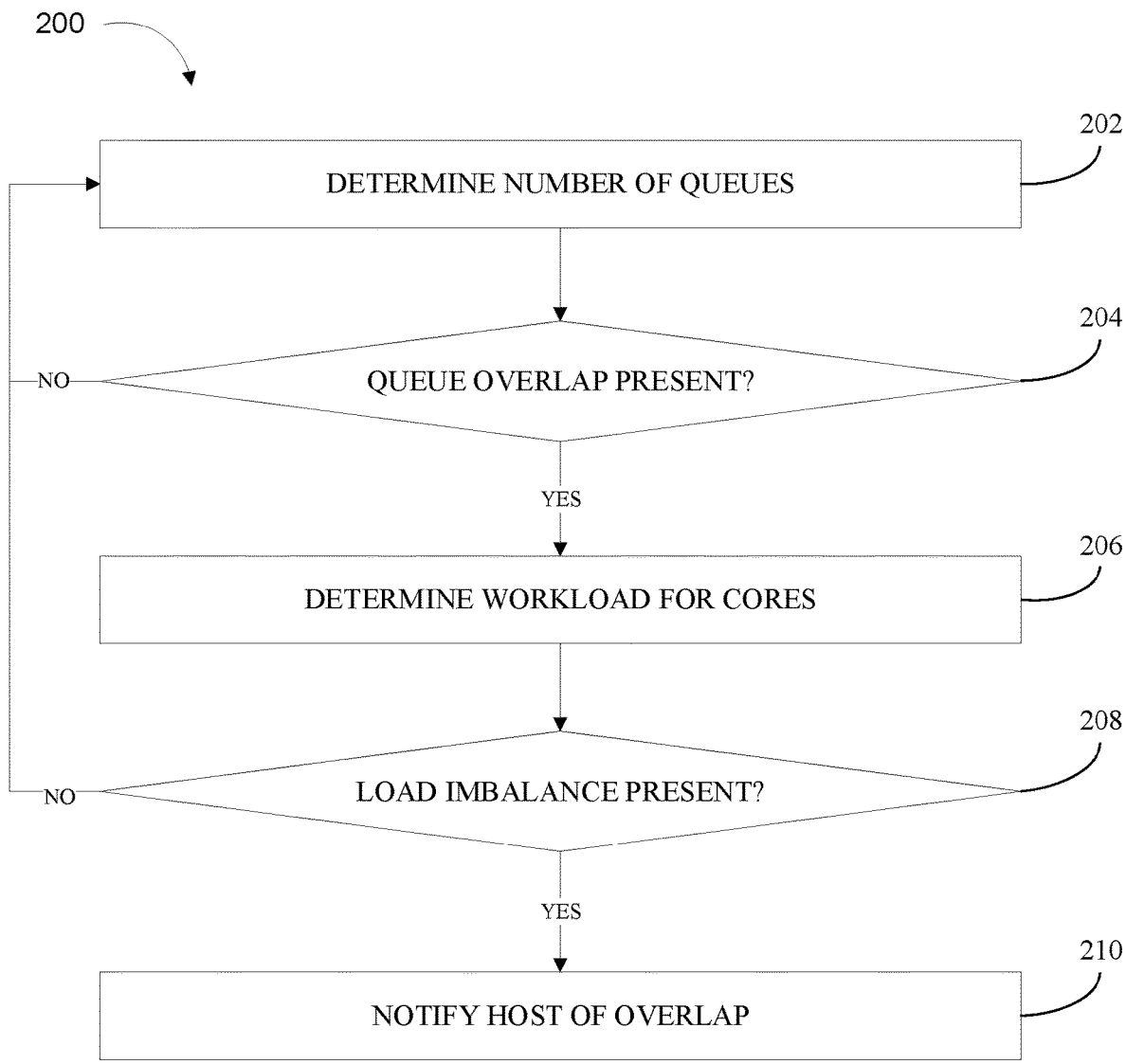
FIG. 2 illustrates a flow chart of an example method for improving queue management in a storage system in accordance with some embodiments of the present disclosure.

FIG. 2 depicts a flowchart of an example method 200, that can be performed in a computing environment (e.g., computing environment 100 and/or storage system 110). One or more of the advantages and improvements described above for identifying and remedying I/O queue overlap can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a storage system manager (e.g., storage system manager 105 of FIG. 1), a computing device (e.g., storage system 110 of FIG. 1), or a different combination of hardware and/or software. In various embodiments, the various operations of method 200 are performed by one or more of storage system manager 105, storage system 110, monitoring daemon 115, queue manager 120, storage controller 125, cores 130, and/or other components within computing environment 100.

At operation 202, storage system manager 105 determines the number of I/O queues. In some embodiments, the number of I/O queues is determined by counting the queues that have been distributed to cores and not returned. This can be done by queue manager 120. The queues may also be counted by monitoring daemon 115.

At operation 204, storage system manager 105 determines if queue overlap is present. In some embodiments, queue overlap occurs if there are more I/O queues distributed than cores 130. In some embodiments, determining if queue overlap is present includes comparing the total number of queues distributed to cores 130 to the number of cores 130. If the number of distributed queues is higher than the number of cores 130, then a queue overlap condition may exist. In some embodiments, determining if queue overlap exists includes checking each core for the number of queues distributed to the core. This can be performed by monitoring daemon 115 and/or by queue manager 120.

In some embodiments, determining if queue overlap is present includes determining the number of hosts that are connected to storage system 110. In some embodiments, overlap may occur when at least two hosts are concurrently connected to storage system 110. For example, if a single host is connected, the host admin queue can distribute one queue to each core, thereby avoiding a queue overlap condition.

If a queue overlap condition is not present (204: NO), then storage system manager 105 returns to operation 202. If a queue overlap condition is present (204: YES), the storage system manager 105 proceeds to operation 206.

At operation 206, storage system manager 105 determines the workload on each core. In some embodiments, operation 210 includes determining the workload of each of cores 130. In some embodiments, the workloads are determined by monitoring daemon 115. The workload may be related to the I/O queue, and therefore different queues may have different workloads. In some embodiments, determining the workload includes calculating a load differential between the cores. Load differential represents the difference in load (e.g., work being performed) by a core. It can be calculated in definitive values or in relative values. In various embodiments, multiple differentials are calculated. There can be a differential for each core compared to every other core. For example, if one storage system has 3 cores, then 3 differentials (the differentials between cores 1 and 2, cores 1 and 3, and cores 2 and 3) would be calculated. In some embodiments, a single differential is calculated. This may be the difference between the most and least loaded cores, between the highest and a median loaded core, between two random cores, or any other combination of cores.

In some embodiments, the workload is determined by analyzing the system tuples. Storage system manager 105 creates and maintains (e.g., updates) one or more tuples. A tuple is data structure that allows grouping of data in a desired sequence. For example, a tuple could include an I/O queue identifier, the host that sent the I/O queue, which core the queue is assigned to, a value representing workload, (e.g., <I/O queue 123, host A 140, core 130 (2), . . . , . . . >) or any combination of the foregoing. The tuples may also include additional data points. In some embodiments, the one or more tuples are a log of the current and previous loads on the various cores. There can be a tuple for each I/O queue, for each core, for each host, or all data may be stored in a single tuple.

At operation 208, storage system manager 110 determines if a load imbalance is present. A load imbalance may occur when a first core has a higher percentage of the total throughput than a second core or a third core. In some embodiments, the load imbalance is determined by analyzing the results of operation 206. In some embodiments, a load imbalance is present if a single core is overloaded. However, it is possible to have multiple cores overloaded. In some embodiments, it is determined if a load imbalance is present by determining (e.g., calculating) a difference between two separate cores.

In some embodiments, there is a load imbalance when the load differential between cores is greater than a predetermined value. The amount can be an absolute value (e.g., cycles, IOPS, etc.), or a relative value (e.g., 5% more load). The predetermined value may be adjusted based on specific need of the system. Also, the predetermined value may be stored in and controlled by storage system manager 105.

In some embodiments, there is a load imbalance when there is a load differential present for a predetermined period of time. In some embodiments, the predetermined period of time is measured in absolute time units. Absolute time units can be milliseconds or any plurality thereof (e.g., milliseconds, microseconds, etc.). In some embodiments, the predetermined period of time is measured by events (e.g., cycles, number of writes, etc.) The predetermined period of time may be adjusted based on specific need of the system. Also, the predetermined period of time may be stored in and controlled by storage system manager 105. The time of load imbalance may be determined by storage system manager 105, monitoring daemon 115 and/or the other components of storage system 110.

If a load imbalance is not present (208: NO), then storage system manager 105 returns to operation 202. If a load imbalance is present (208: YES), the storage system manager 105 proceeds to operation 210.

At operation 210, storage system manager 105 notifies the host of the overlap condition. In some embodiments, operation 210 is performed in response to storage system manager 105 determining a queue overlap exists in operation 204.

In some embodiments, the notification is sent to all hosts that have a queue assigned to the affected core (or connected host). The affected core may be a core that has an overlap condition, or the affected core may be when there is a queue overlap and a load imbalance simultaneously. In some embodiments, the notification is sent to just one of the connected hosts, to all but one of the connected hosts, or to any number of the connected hosts. The hosts that are notified can be based on the timing of the connection (e.g., last host to connect is notified), the relative workload (e.g., least amount of resources consumed), the estimated effect on the host, and/or any other similar factor.

In some embodiments, the notification may be sent to the hosts in-band. The in-band notification may be through the established connection between the host and the storage system (e.g., NQN). This can be completed with NVMe asynchronous event request (NVMe AER) or other similar communication methods. In some embodiments, the notification may be sent to the hosts out-of-band. The out-of-band communication could be through a different connection protocol. This may be completed using a native application programming interface call (API call) or other similar method to notify the hosts of the condition.

In some embodiments, operation 210 includes the host responding to the notification. Each host may respond differently to a notification based on the I/O workload pattern in the host. In various embodiments a host may maintain the connection and risk sub-optimal performance, may abort and re-initiate the connection, or abort the request and attempt to handle it at a later time.

Consider the following example of how the system in computing environment 100 of FIG. 1 and the method of FIG. 2 provide some of the benefits of the present disclosure. This is not intended to be all encompassing and should not limit the disclosure in any way. Consider a storage system that has four cores and is connected to two hosts, host A 140 and host B 145. Each host will create 4 I/O queues (A1-4, B1-4), where A1(B1) has the highest workload and A4(B4) has the lowest workload: queue A1 and B1 are associated with core 1, queue A2 and B2 with core 2, and so on. Storage system manager 105 would determine there is overlap present and load imbalance. It would then notify host B 145 of the situation. Host B 145 could then abort the connection, and subsequently reestablish it, but send I/O queue B4 to core 1, B3 to core 2, and so on. The queue overlap could not be eliminated because of the limited number of cores. However, the storage system, and both hosts will have better overall efficiency with the more balanced loads across the cores.

Figure 3:
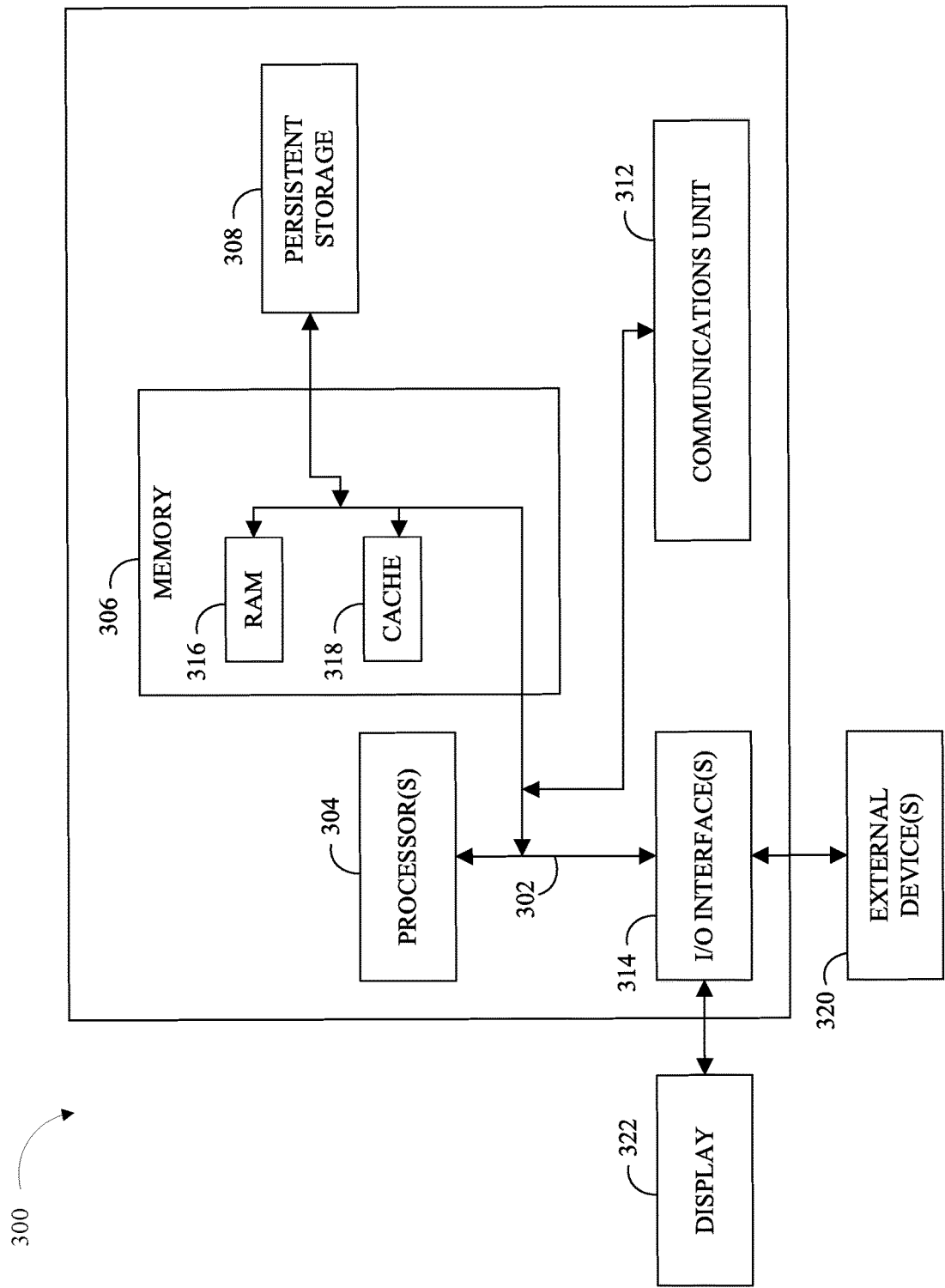
FIG. 3 illustrates a block diagram of an example computer system, in accordance with various embodiments of the present disclosure.

FIG. 3 is a block diagram depicting components of a computer 300 suitable for storage system manager 105 in accordance with at least one embodiment of the present disclosure. In one embodiment, computer 300 is representative of storage system 110, host A 140 and/or host B 145. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for storage system manager 105 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
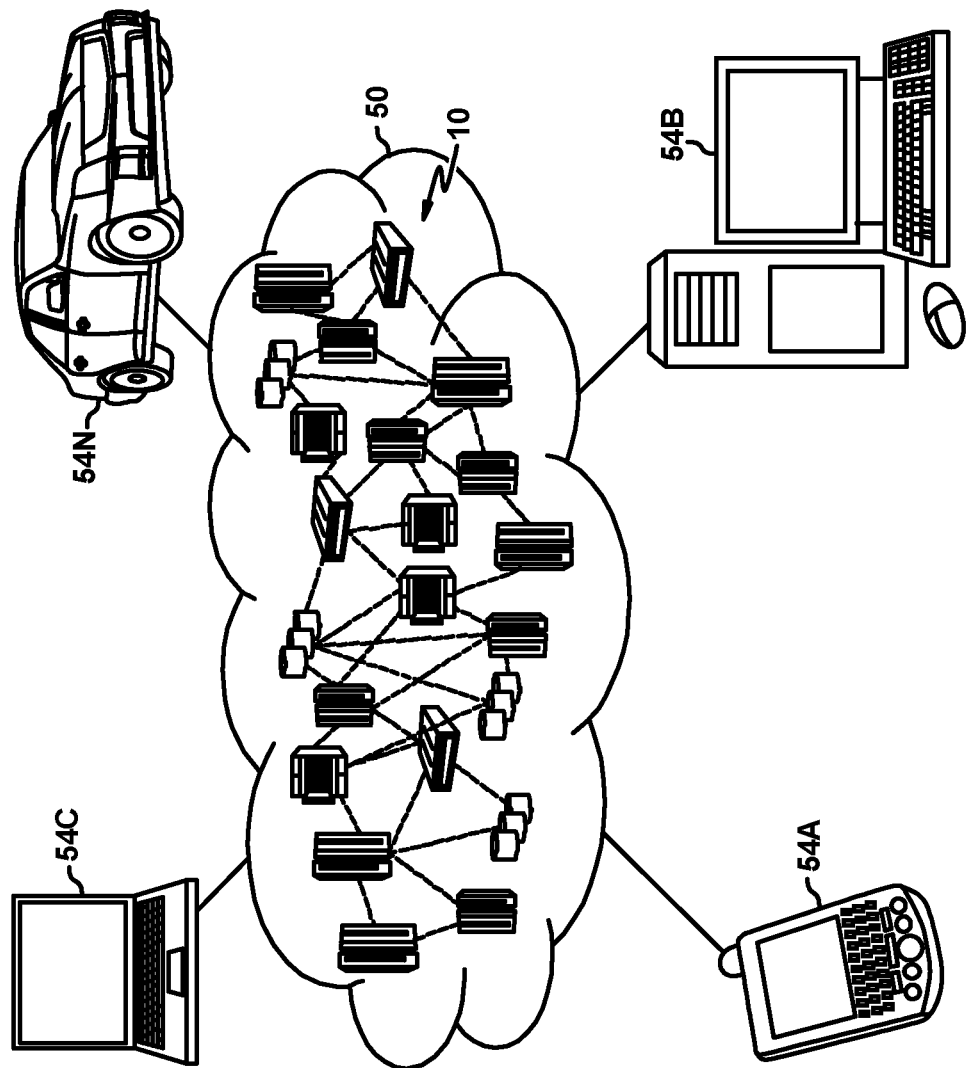
FIG. 4 depicts a cloud computing environment, in accordance with some embodiments of the present disclosure.

Referring now to FIG. 4 illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 5:
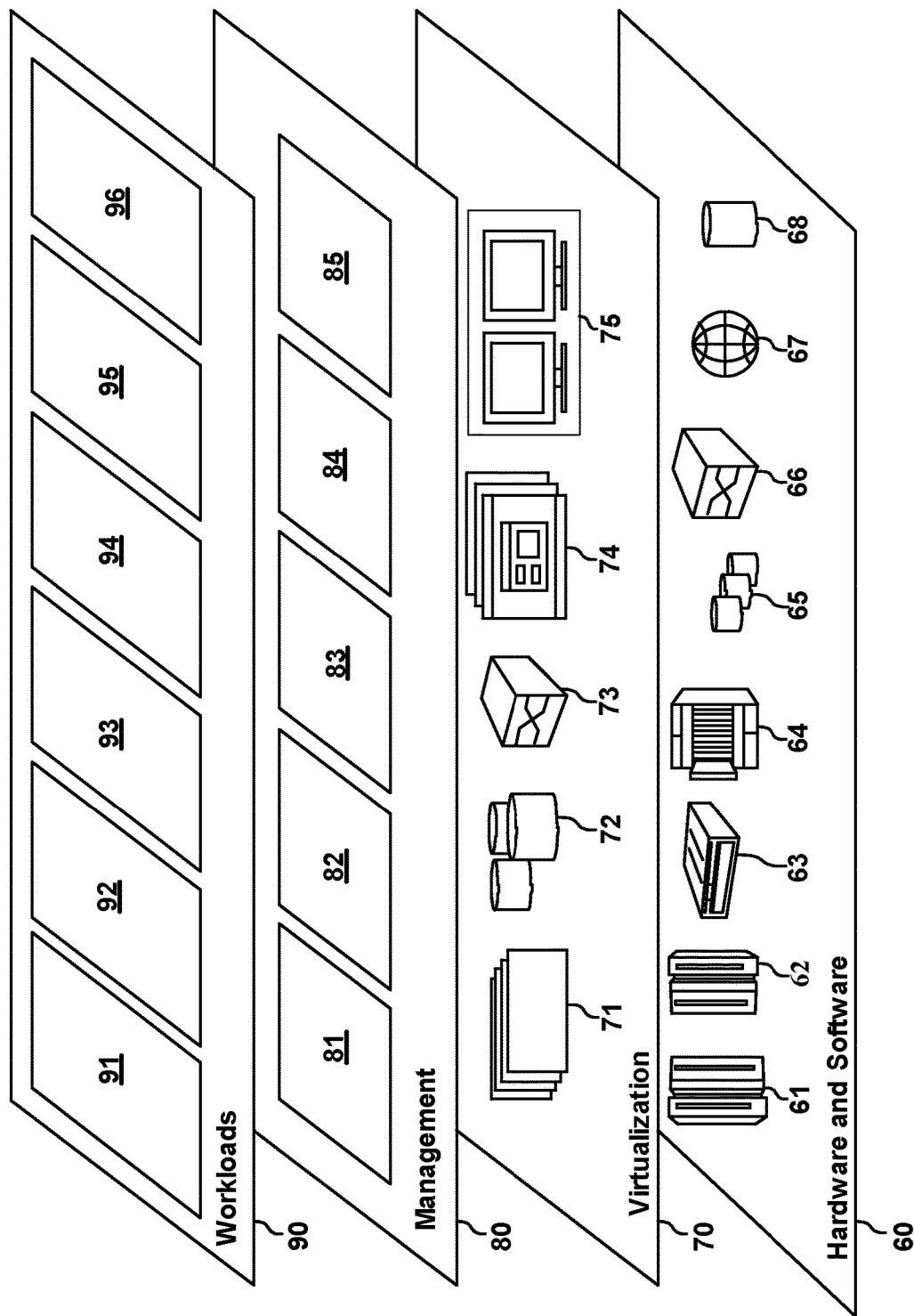
FIG. 5 depicts abstraction model layers, in accordance with some embodiments of the present disclosure.

Referring now to FIG. 5 a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and retrieval 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying, by a storage system, a plurality of queues including a first queue associated with a first host and a second queue associated with a second host, wherein the storage system includes a plurality of cores including a first core and a second core;
   determining, by the storage system, that the first queue and the second queue are being processed by the first core;
   monitoring a workload of each of the plurality of cores;
   identifying a load imbalance between a first workload associated with the first core, and a second workload associated with the second core;
   notifying the second host that the load imbalance is present;
   aborting, by the second host, a connection between the second host and the storage system;
   removing, in response to the second host aborting the connection, the second queue from the first core;
   recreating, by the second host, the connection to the storage system; and
   assigning, in response to the second host recreating the connection, the second queue to the second core.

2. The method of claim 1, further comprising:
   assigning a third queue to the first core, in response to the second host recreating the connection with the storage system, wherein the third queue is associated with the second host and the third queue includes less workload than the second queue.

3. The method of claim 1, wherein the notifying occurs via a non-volatile memory express (NVMe) qualified name (NQN) connection between the second host and the storage system.

4. The method of claim 1, wherein the notifying occurs via an out-of-band communication.

5. The method of claim 4, wherein the out-of-band communication includes an application programming interface call.

6. The method of claim 1, wherein the difference exists for a predetermined period of time.

7. The method of claim 6, wherein the predetermined period of time is measured in absolute time units.

8. The method of claim 6, wherein the predetermined period of time is measured in core cycles.

9. The method of claim 1, wherein the difference is greater than a predetermined value.

10. A system comprising:
    a processor; and
    a computer-readable storage medium communicatively coupled to the processor and storing program instructions which, when executed by the processor, are configured to cause the processor to:
      identify, by a storage system, a plurality of queues including a first queue associated with a first host and a second queue associated with a second host, wherein the storage system includes a plurality of cores including a first core and a second core;
      determine, by the storage system, that the first queue and the second queue are being processed by the first core;
      monitor a workload of each of the plurality of cores;
      identify a load imbalance between a first workload associated with the first core, and a second workload associated with the second core;
      notify the second host that the load imbalance is present;
      abort, by the second host, a connection between the second host and the storage system;
      remove, in response to aborting the connection, the second queue from the first core;
      recreate, by the second host, the connection to the storage system; and
      assign, in response to recreating the connection, the second queue to the second core.

11. The system of claim 10, wherein the notifying occurs via a non-volatile memory express (NVMe) qualified name (NQN) connection between the second host and the storage system.

12. The system of claim 10, wherein the notifying occurs via an out-of-band communication.

13. The system of claim 10, wherein the difference exists for a predetermined period of time.

14. A computer program product, the computer program product comprising a computer readable storage medium having program instructions embodied therewith, the program instructions executable by a processing unit to cause the processing unit to:
    identify, by a storage system, a plurality of queues including a first queue associated with a first host and a second queue associated with a second host, wherein the storage system includes a plurality of cores including a first core and a second core;
determine, by the storage system, that the first queue and the second queue are being processed by the first core;
monitor a workload of each of the plurality of cores;
identify a load imbalance between a first workload associated with the first core, and a second workload associated with the second core;
notify the second host that the load imbalance is present;
abort, by the second host, a connection between the second host and the storage system;
remove, in response to aborting the connection, the second queue from the first core;
recreate, by the second host, the connection to the storage system; and
assign, in response to recreating the connection, the second queue to the second core.

15. The computer program product of claim 14, wherein the notifying occurs via a non-volatile memory express (NVMe) qualified name (NQN) connection between the second host and the storage system.

16. The computer program product of claim 14, wherein the difference exists for a predetermined period of time.

17. The computer program product of claim 16, herein the difference is greater than a predetermined value.

* * * * *